(No Model.)

J. HOOK.
LEATHER EDGE TRIMMER.

No. 503,348. Patented Aug. 15, 1893.

Witnesses:
James Cilley
George H. White

Inventor:
Joseph Hook
By Ithiel J. Cilley
Attorney

UNITED STATES PATENT OFFICE.

JOSEPH HOOK, OF GRAND RAPIDS, MICHIGAN.

LEATHER-EDGE TRIMMER.

SPECIFICATION forming part of Letters Patent No. 503,348, dated August 15, 1893.

Application filed April 28, 1893. Serial No. 472,222. (No model.)

*To all whom it may concern:*

Be it known that I, JOSEPH HOOK, a citizen of the United States, residing at Grand Rapids, in the county of Kent and State of Michigan, have invented certain new and useful Improvements in French Edgers, of which the following is a specification.

My invention relates to improvements in tools for trimming or chamfering the edges of leather in fine harness making and its objects are: first, to provide a tool that may be gaged to cut the exact amount required from the corner of the leather being worked; second, to provide a tool that may be made to cut the corners of the leather at an angle of exactly forty-five degrees; third, to provide a tool that may be made to work at any desired width; and, fourth, to provide a tool with which the gage may be adjusted longitudinally to meet the wear of the tool. I attain these results by the mechanism illustrated in the accompanying drawings, in which—

Figure 1:
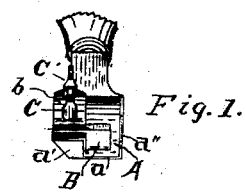
Figure 2:
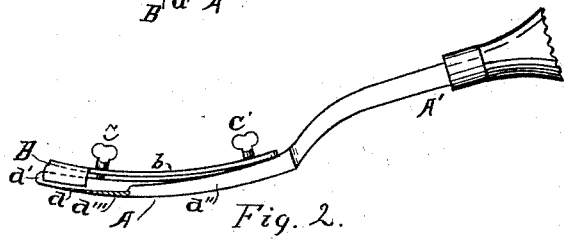
Figure 5:
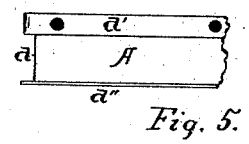
Figure 3:
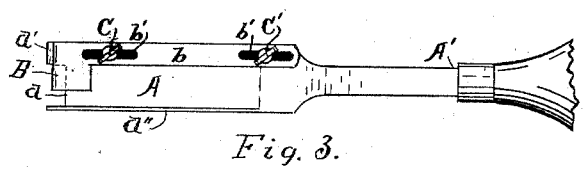
Figure 4:
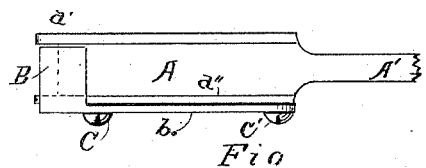
Figure 6:

Figure 1. is an end view of my tool. Fig. 2. is a side view of the same with one guard cut away to show the position of the gage over the cutting edge of the tool. Fig. 3. is a plan of the same. Fig. 4. is the same with the gage attached at the side of the tool. Fig. 5 is the same with the gage removed. Fig. 6. is a side view of the tool with the upper gage in place and the side gage removed to show where the side guard is cut away to receive the gage; and, Fig. 7. is a plan of the same with the side gage in position, and showing a roller in the top gage.

Similar letters refer to similar parts throughout the several views.

The knife portion A. and the handle A'. are the usual form of French edgers as used by all harness makers, and my invention consists: first, in attaching to this edger a spring gage B having a solid head that is designed to stand directly over the cutting edge $a$ of the tool, and between the two side guards $a'$ and $a''$ thereof. This head should be made of steel, and is provided with a long, narrow spring body $b$, which is provided with two slots $b'$ to work over the adjusting screws C and C' so that the gage may be moved endwise to adjust it to the proper position to act in perfect unison with the cutting edge $a$ of the tool. The set screw C' is designed to secure this spring solidly to the tool and prevent it from getting out of place, and the set screw C is intended to adjust the gage to the desired thickness of shaving to be cut from the leather. This gage may, if desired, be made to secure to the side of the tool, as in Fig. 4, in which case it is not necessary to form a spring of the body $b$, as adjustment is attained by throwing the end B. to, or from the tool, using the screw C' as a pivot. To give the tool the proper incline, I cut off, or chamfer the corner of the guard $a'$ as shown in Fig. 1.

Figure 7:
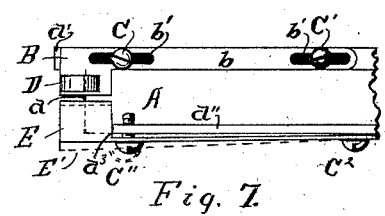

I find that the tool may be made to work much more easily and smoothly by inserting a small antifriction roller D into the head B as shown in Figs. 6 and 7.

For sidewise adjustment, I attach a gage E to the side of the tool opposite the top gage, and secure it by two screws C'' and $C^2$, $C^2$ being designed to hold the end of the gage securely to the side of the tool, and C'' being designed to adjust the width of the cut, by throwing the gage out or in as indicated by the dotted lines E' in Fig. 7. When this gage is used I find it necessary to cut away the end of the guard $a''$ over the point of the cutter as at $a^3$ in Fig. 6, and indicated in Fig. 7.

In the several views I have purposely shown the tool as broken from the handle, for the reason that my improvements relate solely to that portion and has no relation to the handle.

Having thus fully described my invention, what I claim as new, and desire to secure by Letters Patent of the United States, is—

1. The combination, in a French edger, of a cutting tool having side guards, one of said guards having a broad upper surface, for the reception of a gage, the lower outer corner of which is beveled to give the proper form to the corner of the material being worked, and an adjustable upper gage having a spring body and a downwardly projecting head that projects below the side guards to, and directly over the cutting edge of the tool, substantially as shown.

2. The combination, in a French edger, of a cutting tool having side guards, one of which has a broad upper surface, and has its lower outside corner beveled, a top gage adjustably secured to the broad surface of the side guard, the body of said gage being a spring having a head that projects to one side of and below said guide to, and directly over the cutting edge of the tool, and an antifriction roller in said head, substantially as shown.

3. The combination, in a French edger, of a cutting tool having side guards, one of said guards having a broad upper surface, and its lower outside corner beveled, a spring gage adjustably attached to the upper surface of said side guard, and having a solid head projecting below said guard to, and directly over the cutting edge of the tool, and an adjustable side gage substantially as shown and described.

Signed at Grand Rapids, Michigan, this 26th day of April, A. D. 1893.

JOSEPH HOOK.

In presence of—
GEORGE H. WHITE,
ITHIEL J. CILLEY.